Figure 1:
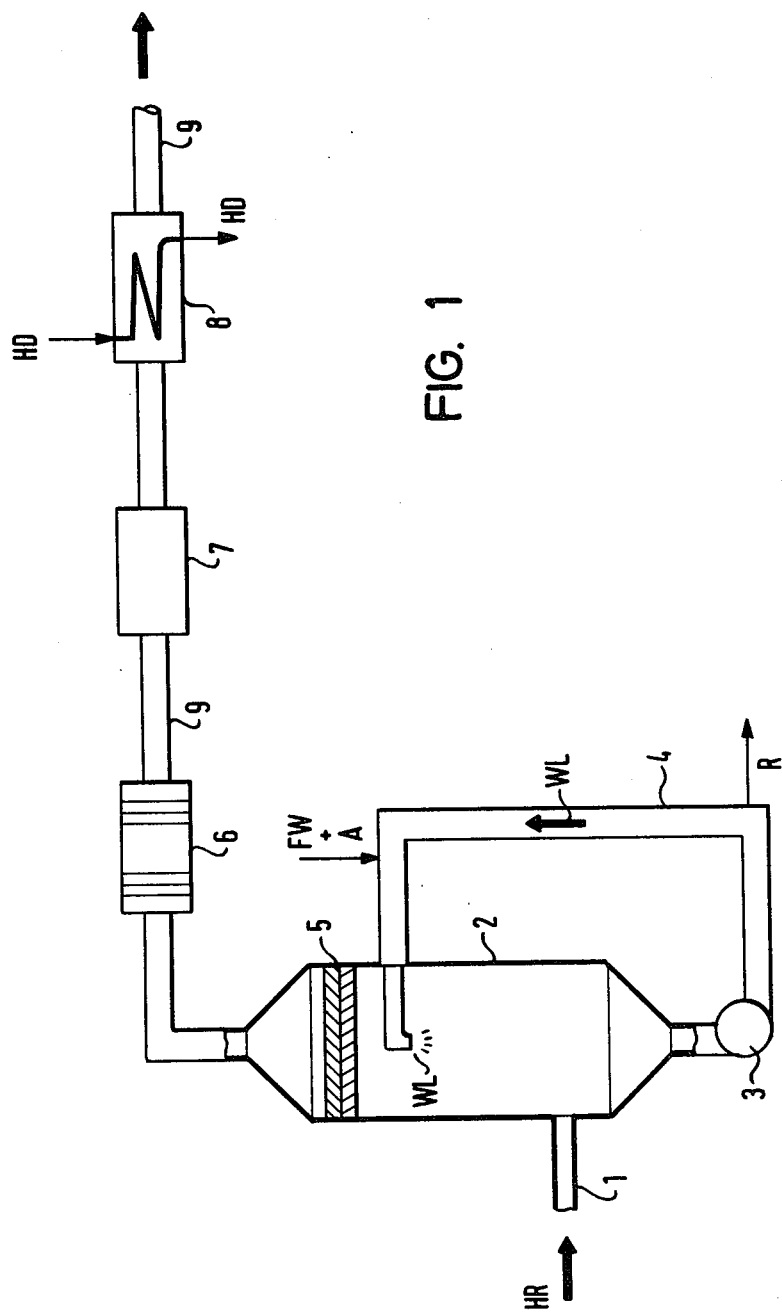

United States Patent [19]

Adrian et al.

[11] Patent Number: 4,472,179
[45] Date of Patent: Sep. 18, 1984

[54] METHOD OF, AND DEVICE FOR, DRYING FLOWING GASES

[75] Inventors: Fritz Adrian, Ratingen; Kayw Than, Essen; Klaus Hannes, Heiligenhaus; Artur Wehrum, Bochum, all of Fed. Rep. of Germany

[73] Assignee: Steag Ag, Fed. Rep. of Germany

[21] Appl. No.: 331,465

[22] Filed: Dec. 16, 1981

[30] Foreign Application Priority Data

Dec. 18, 1980 [DE] Fed. Rep. of Germany ....... 3047776
Mar. 12, 1981 [DE] Fed. Rep. of Germany ....... 3147838

[51] Int. Cl.³ .................. B01D 49/00; B01D 53/34
[52] U.S. Cl. ............................ 55/73; 55/80; 55/222; 55/257 HE; 422/170; 165/1; 165/DIG. 6; 34/4; 34/57 A
[58] Field of Search ............... 55/73, 80, 90, 222, 55/257 HE, 259, 267, 268; 422/170, 173–175; 34/4, 57 A, 57 D; 159/3, DIG. 1, DIG. 3; 219/338, 368, 374; 165/DIG. 6, 1; 432/29, 30, 219

[56] References Cited

U.S. PATENT DOCUMENTS

| | | | |
|---|---|---|---|
| 1,836,004 | 12/1931 | Becker | 55/222 |
| 2,459,986 | 1/1949 | Worden | 219/368 |
| 3,138,440 | 6/1964 | Weitten Hiller et al. | 55/80 |
| 3,519,064 | 7/1970 | Cooper | 219/338 |
| 3,528,179 | 9/1970 | Smith | 159/DIG. 3 |
| 3,585,732 | 6/1971 | Itahashi | 34/57 A |
| 3,687,613 | 8/1972 | Rickard | 55/73 |
| 3,746,504 | 7/1973 | Solbrig et al. | 34/4 |
| 3,889,388 | 6/1975 | Oguri et al. | 34/57 D |
| 3,906,188 | 9/1975 | Gamell | 219/338 |
| 3,942,260 | 3/1976 | Nishitani | 34/4 |
| 4,038,557 | 7/1977 | Gilder Sleeve, Jr. et al. | 159/DIG. 3 |
| 4,277,453 | 7/1981 | Aiken et al. | 55/80 |
| 4,300,920 | 11/1981 | Grove | 55/257 HE |

FOREIGN PATENT DOCUMENTS

| | | | |
|---|---|---|---|
| 558790 | 6/1958 | Canada | 55/90 |
| 2132912 | 11/1972 | France | 159/3 |
| 392044 | 5/1933 | United Kingdom | 159/3 |
| 746959 | 3/1956 | United Kingdom . | |
| 886189 | 1/1962 | United Kingdom . | |
| 949378 | 2/1964 | United Kingdom . | |
| 1135239 | 12/1968 | United Kingdom . | |
| 1242750 | 8/1971 | United Kingdom . | |
| 1247324 | 9/1971 | United Kingdom . | |
| 1530403 | 11/1978 | United Kingdom . | |

Primary Examiner—David L. Lacey
Attorney, Agent, or Firm—Andrus, Sceales, Starke & Sawall

[57] ABSTRACT

The flue gases from a wet-operating flue gas desulfurization plant contain liquid droplets loaded with solid material. These can lead to incrustations which are hard to remove and to corrosion. Previously, in order to dry the droplets, the flow of flue gases was heated by unpurified crude gas, steam or hot water or indirectly by hot air. In order to use less energy in drying the droplets, it is now proposed that the drying energy for evaporating the liquid from the droplets is supplied to the gas flow in a channel by radiant energy from a radiator. The gas flow is only heated to such a degree that the water vapour and carbon dioxide contained in the gas flow selectively absorb radiation of certain wavelengths, while the liquid droplets directly absorb the necessary heat for evaporation. It is also possible for the radiant energy to be absorbed by an assembly which can be heated by radiation and which then releases energy into the gas flow. The assembly can be a contact body vortex bed, for example, or a contact body bed with a device for moving the contact bodies.

37 Claims, 8 Drawing Figures

METHOD OF, AND DEVICE FOR, DRYING FLOWING GASES

This invention relates to a method of, and a device for, drying flowing gases having liquid droplets loaded with solid material suspended therein, in particular gases from a wet-operating flue gas desulphurization plant.

In a flue gas desulfurization plant, hot flue gases are treated in a washing tower with a washing fluid which contains absorption or adsorption agents. Drops of washing fluid which are carried along by the washed flue gases are separated, as far as possible, by a drop filter incorporated in the washing tower and/or a drop filter connected to the washing tower at the outlet side. However, in the gas flow issuing from the drop filter there still remains residual drops in the form of droplets of small diameter which are loaded with solid substance and have a fine smoke-like distribution. The droplets may have an average diameter of 40 μm and a solid content of 10–25 percent by weight, relative to the weight of the droplets. The phrase "droplets loaded with solid material" used in the description and claims refers to droplets of liquid which either contain particles of solid material or in which substances are dissolved which become solid when the liquid is evaporated. If chalk is used as an absorption agent, the solid material may comprise gypsum, dissolved salts, soot particles, ash particles, calcium oxide, calcium carbonate, calcium sulphite. There are also flue gas desulfurizing equipments which work with other absorption agents and which lead to other solid substance reaction products, for example hydrous $NH_3$ as an absorption agent.

A method of drying gases from a wet-operating flue gas desulfurization plant is known in which the cold gases mixed with droplets are heated by the addition of separately heated gases thereto to such an extent that the droplets evaporate and their solid content leaves the plant with the flue gases in the form of dust. The cold and hot gases do not easily mix with each other, so the one gas has to be mixed with the other gas in suspension in order to achieve the mixture required for heating. So as to avoid long mixing phases, a pressure mixer is arranged in the device for carrying out the known method, downstream from the hot gas feeder, in which the two gases undergo intensive turbulence by being repeatedly returned to the deflectors of the pressure mixer. In this method, a proportion of the fine residual drops loaded with solid material strikes against the deflectors, and this leads to incrustations being formed there which are hard to remove and to corrosion of the metal sheets. The heat transfer from the gas to the droplets is impeded by the small size of the droplets, since these are not moved to any great extent in relation to the gas flow either by gravitational force or by the centrifugal force produced by the deflectors, such movement being necessary in order to achieve a greater heat transfer between the gas flow and the droplets. It would also be uneconomical to control the heat content of the hot gas flow in such a way that the mixed gas flow has a high excess temperature improving the heat transfer into the droplets. In a known method, the hot gas flow is controlled in such a way that it results in the pure gas flow being heated to around 5° C.

In the known method, the evaporation takes place in order to avoid contamination, which impedes the heat transfer, or leads to corrosion of the heating surfaces of a flue gas reheating system connected at the outlet side, as a result of deposits from the liquid. As is well known, it is necessary to reheat the cold flue gases emerging from the washing tower in order to expel them from the flue and avoid corrosion to the channel system and flue and a corrosive deposit surrounding the flue. The heating surfaces of the flue gas reheating system can be heated, for example by unpurified crude gas, steam or hot water, or indirectly by hot air. It is also possible to achieve reheating by direct combustion of, for example, gas. In the known method, a constant heating of the whole gas flow in the region of, for example, 5° C. is necessary for evaporating the droplets, so as to be able to discharge the flue gas reheating system.

It is an object of the present invention to provide a method of drying flowing gases in which less energy is used in drying the droplets.

According to the invention there is provided a method of drying flowing gases having liquid droplets loaded with solid material suspended therein, in which the drying energy for evaporating the liquid from the droplets is supplied by radiant energy.

If the absorption capacity of the droplets is sufficient for the supplied radiant energy, then the required evaporation heat can be directly absorbed by the liquid droplets. (This is generally the case when the liquid droplets have a high solid content.) By this means the gas flow is only heated to such a degree that the proportions of water vapour and carbon dioxide contained in the gas flow selectively absorb radiation of certain wavelengths.

If the liquid droplets cannot, or cannot completely, directly absorb the required evaporation heat, then it is appropriate for the radiant energy to be at least partly absorbed by an auxiliary agent arranged in the gas flow, and to be transmitted by convection to the liquid droplets in the flowing gases. The incrustations thereby occurring on the auxiliary agent do not prevent heat absorption by the auxiliary agent and the transmission of heat by convection, since the incrustations formed are heated by the radiation in the same way as the auxiliary agent.

The invention also provides a device for carrying out the method, comprising a channel for the gas flow and a radiator for emitting radiation into the channel so as to evaporate the liquid from the droplets in the flowing gases. In one embodiment of the invention, the radiator is a heat emitter. Heat emitters heated by superheated steam, hot water, hot flue gases etc. can be used, but electrically heated radiation elements or radiation elements directly heated by gas are also possible, and these can also be integrated in the wall of the channel. The channel wall could also itself be heated inductively by an induction loop arrangement or externally by other means (e.g. steam) and therefore act as an emitter.

Instead of the heat emitter, a microwave emitter can be used as the heat radiator.

Particularly in the embodiment where the radiator is a heat emitter, it is appropriate for the radiator to be arranged in the channel so that it lies in a region removed from the gas flow. In such an arrangement, not only is the heat transfer coefficient between the radiator and the gas decreased, but also the probability of wet or moist particles of solid material striking the radiator is reduced.

If the direct absorption of heat is not sufficient, then, in a further embodiment of the invention, an assembly which can be heated by radiation is arranged in the gas flow for subjection to the radiation of the radiator.

Preferably the assembly consists of at least one stationary body which can be heated and which extends substantially in the direction of the gas flow. Metal sheets are suitable for this purpose where the radiator is a heat emitter. The distance between the assemblies should be great enough for the incrustations occurring to have little detrimental effect on the resistance to flow.

Alternatively the assembly may be a contact body bed, through which the gas flow passes, incorporating movable contact bodies, in which case it is particularly appropriate for the radiator to be arranged above the bed. The radiator can be designed in such a way that the radiation heats the contact body bed directly from above and/or laterally from above. This device has the advantage that the movable contact bodies are uniformly exposed to the radiation falling upon the upper side of the bed and are therefore heated by this, and the gas is mixed with the contact bodies, so that an excellent heat transfer is obtained. In contrast to stationary bodies, with movable contact bodies no incrustations can occur, since these are removed by the constant friction of the contact bodies against each other and are steadily removed from the bed support.

In one particular embodiment, the contact body bed is a vortex bed, the contact bodies of which are disturbed by the gas flow. In such an arrangement, however, there occurs an increased pressure loss in the gas flow, which is determined by the so-called point of discontinuity of the contact bodies used. If this increased loss of pressure is not acceptable, it is preferable for moving means to be incorporated in the contact body bed in order to move the contact bodies in the gas flow. The moving means may comprise a mechanical agitator, a vibrator or a magnetic agitator if the contact bodies are magnetisable. Where such moving means are incorporated, the pressure loss is determined only by the thickness of the bed which is necessary for the heat transfer.

In use in a flue gas desulfurization plant, the drying device can be arranged so that a reheater is connected at its outlet side for reheating the purified gas. Alternatively the drying device can also be a reheater. This possibility presents itself particularly in the installation of a vortex bed heated by radiation in the flue gas channel. By simple adjustment of the radiator arranged above the vortex bed, in particular the adjustment of the flow supplied to a microwave emitter, the final temperature of the purified gas can be regulated.

Figure 2:
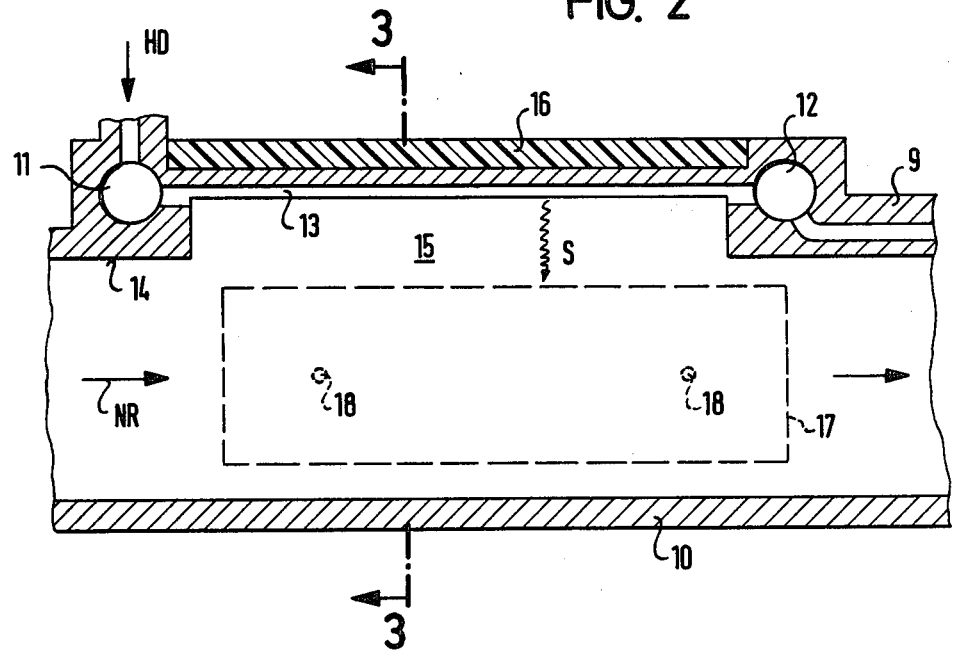
Figure 3:
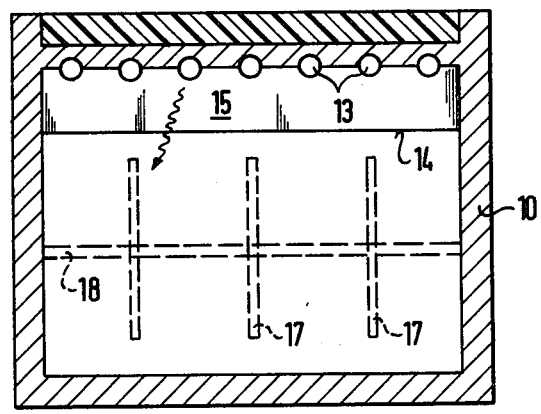
Figure 4:
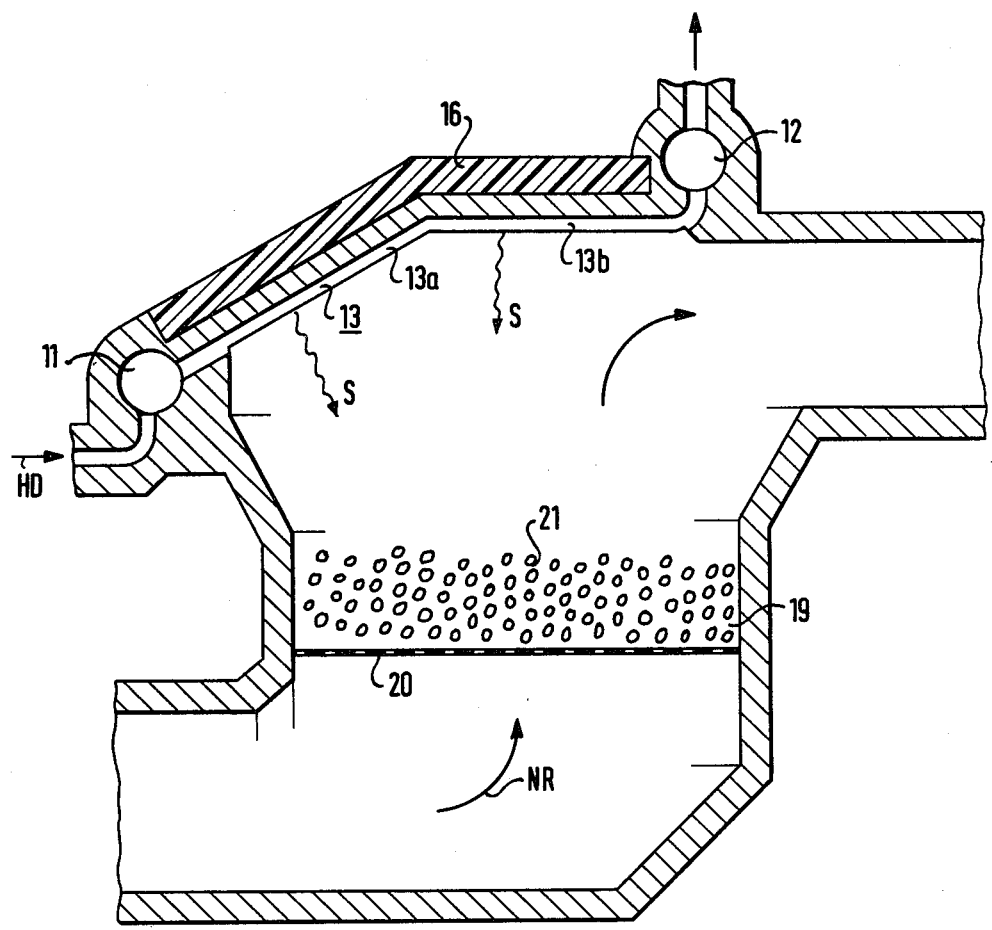
Figure 5:
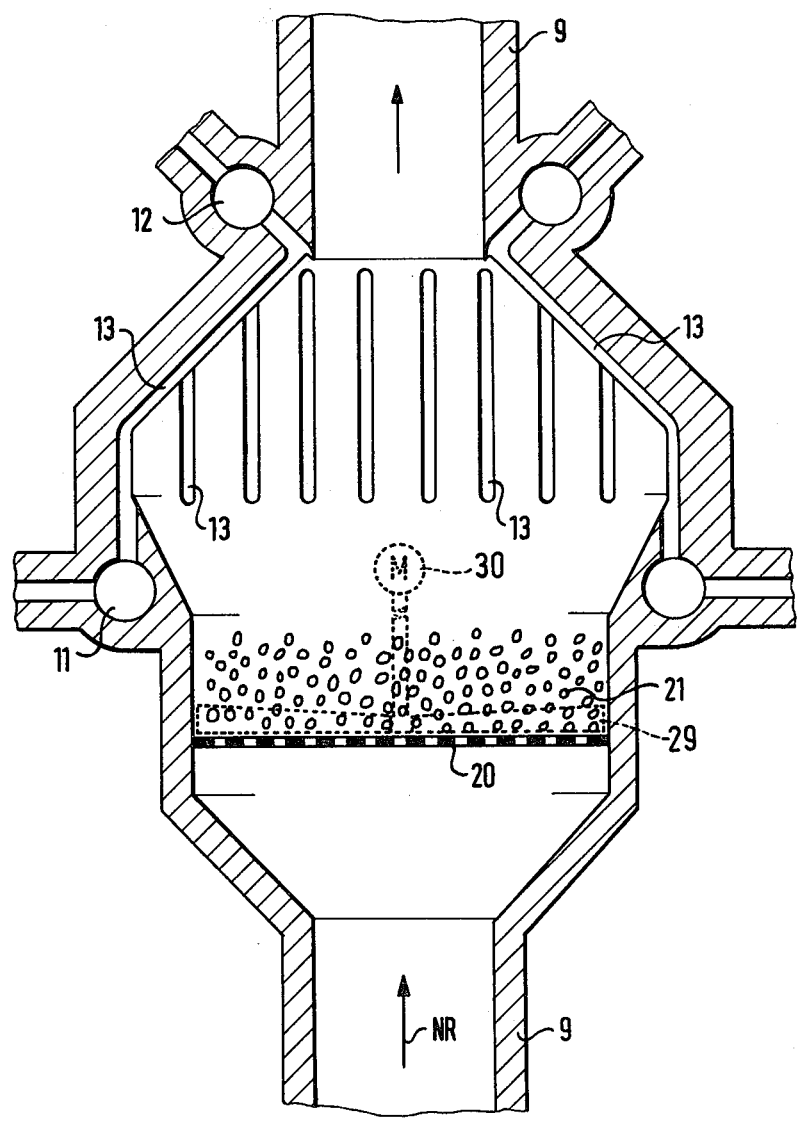
Figure 6:
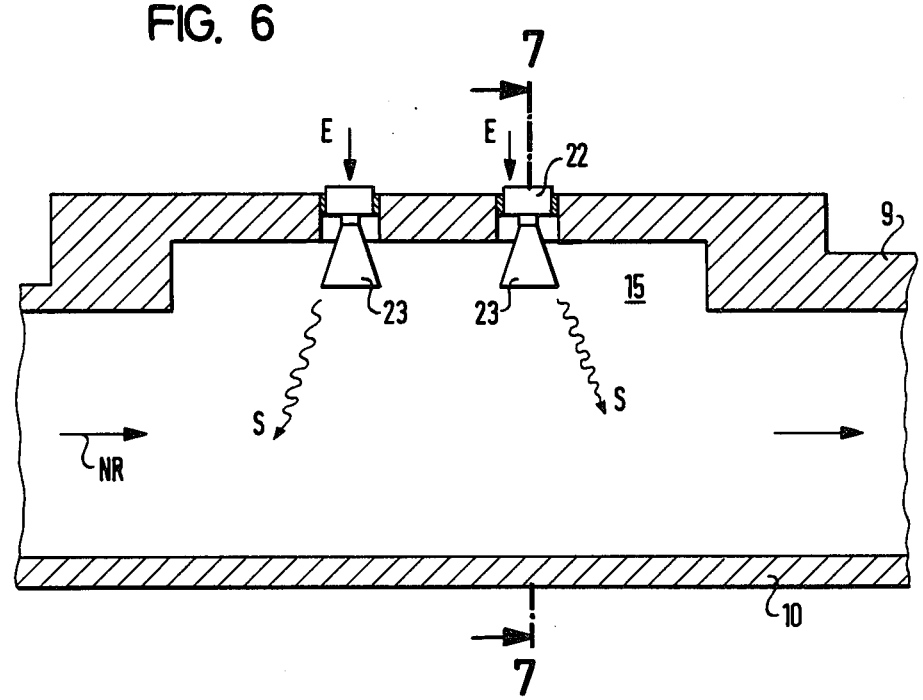
Figure 7:
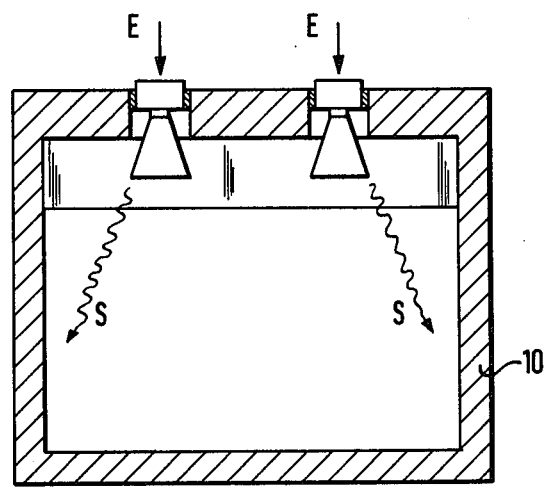
Figure 8:
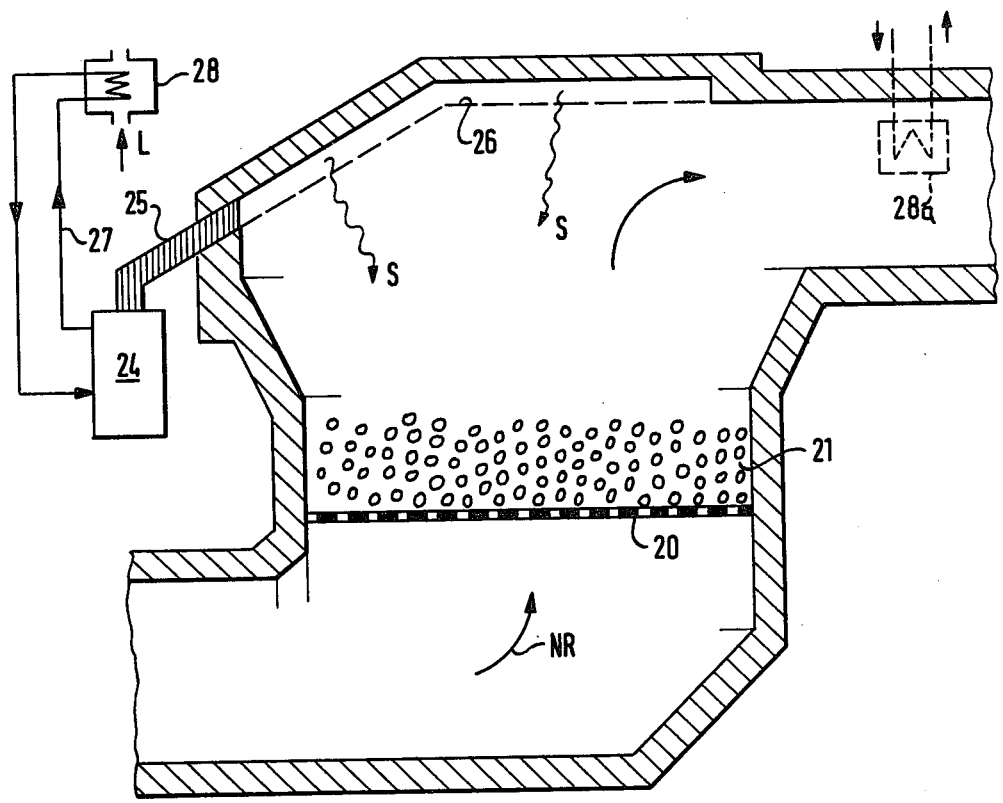

In order that the invention may be more fully understood, methods and devices in accordance with the invention will now be described, by way of example, with reference to the accompanying drawings, in which:

FIG. 1 is a diagrammatic representation of a flue gas desulfurization plant in which the drying device according to the invention can be used, FIG. 2 is a longitudinal section through a first embodiment of drying device utilizing a heat emitter, FIG. 3 is a cross-section taken along the line 3—3 in FIG. 2, FIG. 4 shows a further embodiment of drying device utilizing a heat emitter, FIG. 5 shows a still further embodiment of drying device utilizing a heat emitter, FIG. 6 is a longitudinal section through an embodiment of a drying device utilizing several microwave transmitters, FIG. 7 is a cross-section along the line 7—7 in FIG. 6, and FIG. 8 is a longitudinal section through an embodiment utilizing a single microwave transmitter.

In the flue gas desulfurization plant of FIG. 1, hot flue gases HR are passed through a connector 1 of a washing tower 2. In the washing tower the hot flue gases HR rising upwards are washed in a washing solution WL which is conducted in a circuit 4 by a pump device 3. As is shown by two arrows in the figure, fresh water FW and an absorption agent A, for example CaO, are supplied to the circuit 4 and the reaction products R are drawn off and conducted to a reprocessing stage which is not shown. In the example of the flue gas desulfurization plant shown in FIG. 1, a drop filter 5 is arranged at the upper end of the tower 2, and a further drop filter 6 is connected to the washing tower 2 at the outlet side. There are also washing towers operating according to the direct current method.

A drying device 7 is connected to the drop filter 6 at the outlet side, in which device the drying energy, which is required for evaporating the residual droplets, is supplied by radiant energy.

A flue gas reheating system 8 is connected to the drying device at the outlet side. As is shown by arrows in FIG. 1, this system is heated by a heating agent HD, such as crude gas, steam or hot water.

The drop filters 5 and 6 can also be combined in one efficient drop filter, which is either integrated in the washing tower or connected to the washing tower at the outlet side. The elements 5, 6, 7 and 8 are connected with one another by a thermally insulated gas conduit 9.

In the embodiment of the drying device 7 shown in FIGS. 2 and 3, an inlet accumulator 11 is provided in a section 10 of the gas conduit 9 above the gas flow, and, at a predetermined distance from inlet accumulator 11, an outlet accumulator 12 is also provided. Superheated steam HD is conducted to the inlet accumulator 11. The two accumulators 11 and 12 are connected with each other by tubes 13 extending in the direction of flow, which together form an overhead heat emitter. As can be seen from FIGS. 2 and 3, the tubes 13 lie opposite the upper wall 14 of the channel, set back in the base of a recess 15, that is, in a region removed from, or out of, the flow of the wet flue gases NR flowing from the left in FIG. 2 into the drying device. In order to reduce heat loss, a special insulating layer 16 is provided above the tubes 13, the insulating capacity of which is greater than that of the other wall areas.

The radiation emitted by the tubes is shown by the arrow S. (This symbol is also used in the other Figures.)

It should be pointed out that, in addition to channel sections extending horizontally, sloping channel sections can also be used for this type of drying device. Furthermore, it is possible, for example, to use tubes which are welded together by the insertion of sheet-metal strips instead of arranging the tubes at a distance from each other, these welded tubes then also serving as a gas-tight wall of the channel. Also plate-like heating bodies can be used.

In FIGS. 2 and 3 auxiliary sheets 17 are shown which extend in the direction of flow and are arranged below the recess 15. The sheets 17 are held on the channel wall at a predetermined distance apart from each other by supports 18. These sheets come into use if the liquid droplets are not capable of directly absorbing the amount of heat necessary for evaporation. The radiator formed by the tubes 13 diffuses the radiant heat, so that the radiant heat can penetrate deeply between the sheets arranged parallel to each other and at right angles to the surface of the tubes.

In the embodiment according to FIG. 4, a vortex bed 21 consisting of turbulent bodies is provided on a flow base 20 in a channel section 19 which extends essentially vertically. The vortex bed 21 is heated by a radiator 10 which is comparable with the radiator of FIGS. 2 and 3. The radiator of FIG. 4 differs from that of FIG. 2 only inasmuch as the tubes 13 have a sloping section 13a and a section 13b extending horizontally. The turbulent bodies used for the vortex bed are resistant to the liquid of the droplets and to deposits from the liquid, so that no corrosion takes place, or else they should consist of a material which neutralises the deposits from the liquid, so that in this way, when the flue gases flow through the flue gas channel section 19 and also when the flow is stationary, no corrosion can be caused by the dust discharged from the vortex bed.

Two horizontally extending sections of the gas conduit 9 join up with the vertically extending section 19, so that the arrangement according to FIG. 4 can collectively be described as a gas conduit through which the flow passes horizontally, in which the height of the assembly of the drying device is small.

The embodiment according to FIG. 5 is a drying device having a vortex bed heated by radiation in a channel through which the gas flow passes vertically. The same reference numerals have been used as in FIG. 4. For the sake of simplicity, a special insulating layer which is preferably provided is not shown.

In the embodiment according to FIGS. 6 and 7, instead of a heat emitter in the form of the tubes 13, a microwave emitter is used which consists of several microwave transmitters 22 having tubular transmitter outlets 23, arranged in a specified pattern in the wall of the channel 9, these transmitters being surrounded by sealing means for preventing leakage of gas and microwaves. Microwave transmitters, such as magnetrons and klystrons, are known, so that the transmitters are shown purely diagrammatically in the figures. The microwave transmitters are supplied with electrical current E.

In the embodiment according to FIG. 8, only one microwave transmitter 24 is provided, from which microwave energy is fed into the channel through a closed tubular conductor 25 and a slotted output tubular conductor 26 connected to the former, a vortex bed being provided in the embodiment according to FIG. 8 corresponding to that in FIG. 4. Waste heat from the microwave transmitter 24 is drawn off by a coolant circuit 27 to an air-cooled heat exchanger 28. As is shown by a dotted line on the right of FIG. 8, if the temperature ratios allow it, the energy given off by the microwave transmitter 24 can be used for heating the purified and dried flue gases as by means of heat exchanger 28a.

The embodiments described lead to the gas pressure mixer of the prior art being eliminated. Capital investment for the drying devices is low, as are the maintenance costs. No harmful gaseous substances have to be supplied for the operation of the devices, which would be the case, for example, when heating with a crude gas by-pass circuit. If stationary bodies are provided in the channel, the distance apart of these bodies can be so large that the circuit resistance does not exceed unacceptable levels if incrustations occur. If necessary, a purification device can be provided.

Incrustations do not occur at all with a contact body bed assembly. The radiator may be placed downstream from the bed in the dried gas flow, so that it is guaranteed that incrustations will not appear on it. Materials which are particularly suitable for the contact bodies are inorganic materials which absorb the emitted radiation, such as metals, metal oxide, stone, ceramic, which are essentially abrasion-proof and are resistant to the temperature required. Furthermore, the arrangement only requires a small construction area and involves low capital investment.

In the embodiments according to FIGS. 4, 5 and 8, the mechanical movement of the contact bodies causes the incrustations to disintegrate or the formation of incrustations by the gas flow itself to be avoided. A certain pressure loss in the gas flow provides the mechanical energy of motion, this pressure loss being greater than that which is necessary for the heat transfer at the same bed depth. However, under certain circumstances it is considered to be preferable to supply the mechanical energy of motion by moving means incorporated in the contact body bed, since the expenditure of energy required for this is less than the expenditure of energy required for achieving the point of discontinuity. Preferred examples of the moving means are described in the introduction to the description. In FIG. 5 a mechanical agitator 29 with a driving motor 30 is shown diagrammatically by dotted lines.

Finally, it should again be emphasized that it is not absolutely necessary to connect the conventional flue gas reheating system at the outlet side, particularly not with the vortex bed arrangement, if the radiation heating is arranged in such a way that not only the necessary drying but also the required reheating is made possible.

We claim:

1. A method for drying flowing gases from a wet-operating flue gas desulfurization plant moving through a flow path in a channel, said gases having droplets of liquid loaded with solid material suspended therein, said method comprising the steps of:

arranging a radiator capable of emitting radiation producing heat in said droplets with respect to said channel, said radiator being arranged inside said channel but out of the flow path of the gases and positioned so as to to emit radiant energy into the flow path of the gases; and emitting radiant energy into the flow path from the radiator for application to the gases, said radiant energy being emitted in a quantity sufficient to evaporate the liquid from the droplets in the flowing gases and such that the gases are only heated to a degree that the water vapor and carbon dioxide contained in the gases selectively absorb radiation of certain wavelengths.

2. A method according to claim 1 wherein the radiator is further defined as radiating heat into the flow path of the gases.

3. A method according to claim 1 wherein the radiator is further defined as emitting microwave energy into the flow path of the gases.

4. A method according to claim 1 wherein said method further comprises the steps of: arranging an auxiliary means in the flow path of the gases so as to be spaced from the radiator and subjected to its radiant energy, said auxiliary means being heatable by the radiant energy of the radiator; and applying the gases to the auxiliary means for evaporating the liquid droplets in the flowing gases by convection heating from the auxiliary means.

5. A method according to claim 4 further defined as arranging the auxiliary means so that the gases flow through the auxiliary means for the convection heating.

6. A method according to claim 5 further defined as arranging a stationary auxiliary means in the flow path of the gases.

7. A method according to claim 5 further defined as arranging an auxiliary means having movable contact bodies heatable by the radiant energy in the flow path of the gases.

8. A device for drying flowing gases from a wet-operating flue gas desulfurizing plant, said gases having droplets of liquid loaded with solid material suspended therein, said device comprising:
    a channel forming a flow path for the gases containing the droplets of liquid; and
    a radiator positioned inside said channel but out of the flow path of the gases in said channel, said radiator emitting radiant energy into the channel for application to the gases in said flow path, said radiator being formed and constructed for emitting radiation capable of producing heat in said droplets in a quantity sufficient to evaporate the liquid from the droplets in the flowing gases and such that the gases are only heated to a degree that the water vapor and carbon dioxide contained in the gases selectively absorb radiation of certain wavelengths.

9. A device according to claim 8 wherein said radiator comprises a radiant heat emitter.

10. A device according to claim 9 wherein said radiator comprises a plurality of tubes positioned in a recess in said channel for emitting heat into the channel, said tubes being connected to a supply of a heating agent.

11. A device according to claim 10 wherein said tubes are coupled together to form a gas tight wall of said recess.

12. A device according to claim 11 wherein said tubes are welded together into an assembly forming said gas-tight wall.

13. A device according to claim 8 wherein said radiator comprises a microwave emitter.

14. A device according to claim 13 wherein said microwave emitter radiator comprises a microwave emitter radiator means having plurality of microwave transmitters arranged in a pattern in said channel.

15. A device according to claim 13 wherein said microwave emitter radiator comprises a single microwave transmitter having a tubular microwave energy conductor connected to said channel.

16. A device according to claim 8 wherein said radiator is arranged in a recess in said channel so as to be out of the flow path of the gases.

17. A device according to claim 8 further including auxiliary means mounted in said channel in the flow path of the gases and spaced from said radiator, said auxiliary means being subjected to the radiant energy of said radiator and being heatable thereby for evaporating the liquid droplets in the flowing gases by convection heating.

18. The device according to claim 17 wherein said auxiliary means comprises at least one stationary body mounted in said channel for subjection to the radiant energy of said radiator, said stationary body extending along said channel substantially in the direction of the flow path for the gases.

19. A device according to claim 17 wherein said auxiliary means comprises a pervious contact body bed means having movable contact bodies through which the gases pass, contact bodies being heatable by the radiant energy of said radiator for evaporating the liquid droplets in the flowing gases.

20. A device according to claim 19 wherein said contact body bed is generally horizontally oriented in said flow path and wherein said radiator is arranged above the contact body bed for heating the movable contact bodies.

21. A device according to claim 19 wherein the contact bodies comprise a material resistant to corrosion by the flowing gases and droplets of liquid suspended therein.

22. A device according to claim 19 wherein the drying of the flowing gases produces chemically neutralizable deposits from the droplets of liquid and wherein the movable contact bodies are formed of a material that neutralizes the deposits from the droplets of liquid.

23. A device according to claim 19 wherein said contact body bed is a vortex bed in which the contact bodies are moved by the gas flow.

24. A device according to claim 19 wherein said contact body bed includes movement means for moving the contact bodies.

25. A device according to claim 24 wherein the movement means comprises an agitator.

26. The device according to claim 24, wherein the movement means comprises a vibrator.

27. The device according to claim 8 comprising, in combination, a flue gas desulfurizing washing tower and a drop filter upstream of said device in the flow path for the gases.

28. The combination according to claim 27 wherein said device further comprises a reheater for the flowing gases.

29. The combination according to claim 27 further including a flue gas reheater connected downstream of said device in the flow path for the gases.

30. A device for drying flue gases from a wet-operating flue gas desulfurization plant, said gases having droplets of liquid loaded with solid material suspended therein, said device comprising:
    a channel forming a flow path for the gases containing the droplets of liquid; and
    a pervious contact body bed positioned in said channel and through which the gases pass, said contact bed having movable contact bodies heatable by radiant energy; and
    a radiator positioned inside said channel but out of the flow path of the gases and spaced from said pervious contact body bed, said radiator being formed and constructed for emitting radiation capable of producing heat in said contact bodies in a quantity sufficient to heat the movable contact bodies to evaporate the liquid from the droplets in the flue gases and such that the gases are only heated to a degree that the water vapor and carbon dioxide in the gases selectively absorb radiation of certain wavelengths.

31. A device according to claim 30 wherein said contact body bed is generally horizontally oriented in said flow path and wherein said radiator is arranged above the contact body bed for heating the movable contact bodies.

32. A device according to claim 30 wherein the contact bodies are further defined as formed of a material resistant to corrosion by the flue gases and droplets of liquid suspended therein.

33. A device according to claim 30 wherein the drying of the flue gases produces chemically neutralizable deposits from the droplets of liquid and wherein the movable contact bodies are formed of a material that neutralizes the deposits from the droplets of liquid.

34. A device according to claim 30 wherein said contact body bed is a vortex bed in which the contact bodies are moved by the gas flow.

35. A device according to claim 30 wherein said contact body bed includes movement means for moving the contact bodies.

36. A device according to claim 35 wherein the movement means comprises an agitator.

37. A device according to claim 35 wherein the movement means comprises a vibrator.

* * * * *